United States Patent [19]

Hashimoto et al.

[11] Patent Number: 4,734,452
[45] Date of Patent: Mar. 29, 1988

[54] CURABLE COMPOSITION, METHOD FOR MANUFACTURING THEREOF, AND USES THEREOF

[75] Inventors: Terukuni Hashimoto, Itami; Tsugishige Iwaki, Takatsuki; Masaaki Kitatani, Suita; Masao Nikki, Ibaraki, all of Japan

[73] Assignee: Nippon Shokubai Kagaku Kogyo Co., Ltd., Osaka, Japan

[21] Appl. No.: 892,370

[22] Filed: Aug. 4, 1986

[30] Foreign Application Priority Data

| Aug. 7, 1985 | [JP] | Japan | 60-172503 |
| Feb. 24, 1986 | [JP] | Japan | 61-37218 |
| Feb. 28, 1986 | [JP] | Japan | 61-41951 |
| Mar. 14, 1986 | [JP] | Japan | 61-54586 |
| Mar. 17, 1986 | [JP] | Japan | 61-57090 |
| Mar. 24, 1986 | [JP] | Japan | 61-64231 |
| Apr. 25, 1986 | [JP] | Japan | 61-94584 |

[51] Int. Cl.$^4$ ............................ C08K 3/22; C08K 3/34
[52] U.S. Cl. ...................................... 524/533; 524/786; 524/853; 524/854; 524/788; 524/789; 524/791; 523/322
[58] Field of Search ................ 524/786, 853, 854, 533

[56] References Cited

U.S. PATENT DOCUMENTS

| 3,373,075 | 3/1968 | Fekete et al. | 524/854 |
| 3,835,090 | 9/1974 | Gander et al. | 524/854 |
| 4,221,698 | 9/1980 | Lee, Jr. et al. | 524/853 |
| 4,427,823 | 1/1984 | Inagaki et al. | 524/854 |
| 4,487,798 | 12/1984 | Domeier | 524/533 |
| 4,575,473 | 3/1986 | Pomeier | 524/533 |

FOREIGN PATENT DOCUMENTS

| 104621 | 9/1978 | Japan | 524/786 |
| 103065 | 6/1985 | Japan | 524/786 |

*Primary Examiner*—Lewis T. Jacobs
*Assistant Examiner*—David W. Woodward
*Attorney, Agent, or Firm*—Omri M. Behr

[57] ABSTRACT

A curable composition comprising (A) a monomer mixture containing as an essential component thereof a mixture of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, and having said inorganic filler (B) dispersed in an amount of 250 to 800 parts by weight per 100 parts by weight of said monomer mixture (A).

30 Claims, No Drawings

CURABLE COMPOSITION, METHOD FOR MANUFACTURING THEREOF, AND USES THEREOF

BACKGROUND OF THE INVENTION

1. Field of the Invention:

This invention relates to a curable composition capable of producing cured articles excelling in thermal stability, especially hydrothermal stability, a method for the production of the composition, and uses thereof. More particulary the present invention relates to a curable composition obtained by dispersing an inorganic filler of a specific particle diameter in a specified liquid monomer mixture, a method for the production of the composition, and uses of the composition for artificial marble articles.

2. Description of Prior Art:

Curable resin composition prepared by dispersing various fillers in syrups of such thermosetting resins as unsaturated polyester resin, vinyl ester resin obtained by dissolving epoxy (meth)acrylate in styrene, and epoxy resin have been known to the art. They have been being used for cast molding artificial marble articles and for molding FRP in combination with glass fibers. It has been known to mold artificial marble articles by causing a resin composition prepared by dispersing a filler in a thermoplastic resin syrup such as, for example, a blend of aluminum hydroxide with a syrup of methyl methacrylate, to be set with an organic peroxide as a curing agent (U.S. Pat. No. 3,847,865). These thermosetting resin or thermoplastic resin syrups are molded conventionally by being poured into molds of various shapes or a space between moving belts and then heated to temperatures ranging from normal room temperature to the neighborhood of 60° C. Curable resin compositions of the type to be compression or extrusion molded under application of heat and pressure in metal molds have been also known to the art. Resin mortar or premix molding materials prepared by mixing such thermosetting resins as unsaturated polyester resin and vinyl ester resin with various fillers and aggregates and, optionally, incorporating in the resulting mixtures glass fibers and thickners for the purpose of enhancing viscosity are examples.

The curable resin compositions using the syrups and used for the cast molding are such that the amounts and sizes of the fillers effectively usable therein have their own limits because the compositions are required to maintain their viscosity low enough to suit cast molding. When a filler is used in a large amount for the purpose of obtaining a cured article of a high filler content excelling in thermal stability and flame retardance, the produced cured article does not assume good appearance because the filler is not easily diffused in the syrups during the preparation of the composition. For the purpose of preventing the high filler content from increasing the viscosity of the produced curable resin composition, there is employed, for example, a method which resorts to selection of a filler of the largest possible particle diameter that entails no sedimentation. The cured article obtained by polymerizing such a curable resin composition as described above, therefore, has the disadvantage that it sustains a cracking the surface because of insufficient filler dispersion or because of large particle diameters of filler and consequently admits of water and, on being immersed in boiling water, quickly blushes and loses its good appearance.

In the case of the aforementioned curable resin composition using resin mortar or premix molding materials and used for molding under simultaneous application of heat and pressure, the amounts of their fillers allowed to be incorporated in producing doughlike masses excelling in workability during the compression molding have their own limits. Generally, the upper limits of these amounts are 200 parts by weight based on 100 parts by weight of the resin. In the cured products obtained by polymerizing such curable resin compositions, the resins show poor adhesion to the fillers or aggregates and the resins offer poor resistance to water. The cured products have a disadvantage that, when they are immersed in boiling water, they quickly sustain damage to the surface and blush and lose luster. Further, these cured products are deficient in thermal stability and are susceptible of discoloration at elevated temperatures. In a burning cigerret test, they are conspicuously stained with tar. In applications such as bathtubs, dressing tables, button blank, electric parts, and kitchen counters which require resistance to flame, heat and hot water, the conventional curable resin compositions manifest insufficient performance.

A method of imparting improved hydrothermal stability to the cured products of such curable resin compositions by gel coating the cured products with unsaturated polyester resin or vinyl ester resin has found acceptance. The cured products which have undergone the gel coating treatment, however, have the disadvantage that they are deficient in thermal stability so as to sustain irreparable blisters and other similar blemishes on exposure to a burning cigerret or hot water.

An object of this invention, therefore, is to provide a novel curable composition, a method for the production of the curable composition, and uses of the curable composition.

Another object of this invention is to provide a curable composition capable of affording cured products excelling in thermal stability and flame retardance without requiring any gel coating treatment, a method for the production of the curable composition, and uses of the curable composition.

SUMMARY OF THE INVENTION

The objects described above are accomplished by a curable composition which comprises (A) a monomer mixture containing as an essential component thereof a mixture consisting of 20 to 80% by weight of an aliphatic polyfunctional (meth)acrylate and 80 to 20% b weight of an aromatic vinyl compound, (B) an inorganic filler having an average particle diameter of not more than 5 microns, and (C) a catalytic amount of a polymerization initiator, with the inorganic filler (B) dispersed in an amount of 250 to 800 parts by weight in 100 parts by weight of the monomer mixture (A).

The aforementioned objects are further accomplished by a method for the production of a curable composition, which comprises causing (A) a monomer mixture containing as an essential component thereof a mixture consisting of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, with the inorganic filler (B) used in an amount of 250 to 500 parts by weight based on 100 parts by weight of the aformentioned monomer mixture (A), to be mixed in a high-speed stirrer until they form a liquid mixture having a viscosity of 2 to 100 poises.

The aforementioned objects are also accomplished by a method for the production of a curable composition, which comprises causing (A) a monomer mixture containing as an essential component thereof a mixture consisting of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, with the inorganic filler (B) used in an amount of 250 to 800 parts by weight based on 100 parts by weight of the aforementioned monomer mixture (A), to be mixed in a low-speed kneader until they form a doughlike mass.

The curable composition described above, used either alone or incombination with reinforcing fibers, is put in molds and then heated, optionally under simultaneous application of pressure to give rise to various cured products such as, for example, artificial marble articles and FRP articles. The curable composition is used in impregnating reinforcing fibers or reinforcing short fibers or is combined with these fibers to give rise to fiber-reinforced thermosetting molding materials or premix molding materials. Thus, in a wide variety of uses, the curable composition manifests an outstanding performance.

PREFERRED EMBODIMENT OF THE INVENTION

The aliphatic polyfunctional (meth)acrylates which are usable for the present invention include ethylene glycol di(meth)acrylates, propylene glycol di(meth)acrylates, butylene glycol di(meth)acrylates, neopentyl glycol di(meth)acrylates, glycerin tri(meth)acrylates, trimethylolpropane tri(meth)acrylates, and dipentaerythritol hexa(meth)acrylates.

Examples of the aromatic vinyl compound include styrene, α-methylstyrene, p-methylstyrene, and divinylbenzene.

The proportions of the aliphatic polyfunctional (meth)acrylate and the aromatic vinyl compound may be 20 to 80% by weight of the former and 80 to 20% by weight of the latter. Preferably the proportions are 30 to 70% by weight of the former and 70 to 30% by weight of the latter. For the monomer mixture (A) to be used in the curable composition of the present invention, the aforementioned two monomers are essential components. It is nevertheless permissible to use as part of the monomer mixture (A) a various (meth)acrylate monomer such as (meth)acrylic acid or salt thereof, methyl (meth)acrylate, isobutyl (meth)acrylate, or trifluoroethyl (meth)acrylate, a various macromonomer, or other monomer or oligomer such as unsaturated polyester oligomer, fumaric esters, or maleimides. It should be noted, however, that use of such other monomer or oligomer could render the manufacture of a cured product of a high filler content difficult or could result in manufacture of a cured product deficient in thermal stability or hydrothermal stability.

The monomer mixture (A) to be used in the present invention may be used in a form having a thermoplastic polymer dissolved or dispersed therein for the purpose of curbing shrinkage of the cured product. The thermoplastic polymer which is used for curbing the shrinkage and preventing the cured product from sustaining cracks and enhancing the surface smoothness is any polymer which is generally used for the purpose of curbing the shrinkage and is only required to be soluble or dispersible in the monomer mixture (A). Examples of the polymer meeting the requirement are (meth)acryl type polymers such as polymethyl methacrylate, (meth)acryl-styrene copolymers, polystyrene, polyvinyl acetate, styrene-vinyl acetate copolymer, polyvinyl chloride, polybutadiene, polyethylene, polycaprolactam, and saturated polyesters. These conventional low-shrinkage grade polymers may be used either singly or in the form of a mixture of two or more members. The low-shrinkage grade thermoplastic polymer, when used in a large amount, has the possibility of increasing the viscosity of the monomer mixture (A), rendering difficult the manufacture of a curable composition of a high filler content suitable for cast molding, and preventing the cured product from exhibiting satisfactory transparency and thermal stability. It is, therefore, desirable that the low-shrinkage grade thermoplastic polymer should be used in an amount as small as possible. Desirably, this polymer is used in an amount of not more than 40 parts by weight, preferably in an amount falling in the range of 5 to 30 parts by weight, based on 100 parts by weight of the monomer mixture (A).

The curable composition may use therein a thickening thermoplastic polymer for the purpose of adjusting the viscosity of the composition and further enhancing the workability of the composition during the course of press molding operation. The thickening thermoplastic polymer is required to be of a type enabled to assume increased viscosity by the use of a various thickening agent. For the thickener based on such a metal oxide as magnesium oxide or calcium oxide or such a metal hydroxide as magnesium hydroxide or calcium hydroxide, a polymer possessing two or more carboxyl groups in the molecular unit thereof can be used. Examples of the thermoplastic polymer meeting the requirement include binary polymethyl meth-acrylate type polymers having a small amount of (meth)acrylic acid copolymerized with methyl methacrylate, ternary polymers having a samll amount of (meth)acrylic acid copolymerized with methyl methacrylate and styrene, maleic rubber type polymers resulting from combination of butadiene or isoprene with maleic acid, and terminal carboxyl group saturated polyesters.

As other thickening thermoplastic polymers, those polymers which possess two or more hydroxyl group in the molecular units thereof may be cited. These polymers effect required enhancement of viscosity through formation of a urethane bond with polyfunctional isocyanate compounds. Examples of the thickening thermoplastic polymer meeting the requirement include polyols such as polyethylene glycol, terminal hydroxyl group saturated polyesters, and polymers resulting from copolymerization of a small amount of hydroxyethyl (meth)acrylate with methyl methacrylate.

The thickening thermoplastic polymer described above is used as dissolved in the monomer mixture (A). The amount of this polymer to be used is not more than 100 parts by weight, preferably in the range of 5 to 40 parts by weight based on 100 parts by weight of the monomer mixture (A). By suitably varying the amount of the thickening thermoplastic polymer within the aforementioned range to suit the extent of increase of viscosity required, the finally produced curable composition excels in workability and in fluidity during the course of molding under application of heat and pressure.

The inorganic filler (B) to be used in this invention has no specific restriction except for the requirement that it should possess an average particle diameter of not more than 5 microns. Any of the conventional inorganic fillers such as calcium carbonate, talc, clay, silica, alumina, quartz, and calcium silicate, and hydrated metal oxides like aluminum hydroxide, magnesium hydroxide and calcium hydroxide. In these inorganic fillers (B) which have average particle diameters of not more than 5 microns, hydrated metal oxides prove particularly desirable because they are stably dispersible in ample amounts and are capable of imparting particularly high thermal stability and flame resistance to the cured products. Among other hydrated metal oxides enumerated above, aluminum hydroxide proves particularly desirable because it permits production of a cured article possessing good appearance resembling marble, i.e. an artificial marble of high commercial value.

The inorganic filler (B) is advantageously used when it has an average particle diameter not exceeding 5 microns, preferably falling in the range of 0.5 to 4 microns. If an inorganic filler having an average particle diameter exceeding 5 microns is used, it is dispersed stably in the monomer mixture with difficulty and the cured article obtained by curing the resulting curable composition, on being immersed in boiling water, quickly blushes and suffers from degradation of hydrothermal stability. If an inorganic filler having average particle diameter of less than 0.5 micron is used, the labor required for the dispersion of the filler in the monomer mixture is liable to increase because of the secondary cohesive force of the filler.

To obtain the curable composition of the present invention, the inorganic filler (B) must be dispersed in the monomer mixture (A). The curable composition, depending on the method to be used in this invention for this dispersion, can assume the form of a liquid having a high filler content and low viscosity suitable for cast molding or the form of a doughlike mass excelling in fluidity under application of pressure.

When the inorganic filler (B) and the monomer mixture (A) are mixed by the use of a high-speed stirrer such as a disperser or a homo-mixer, the resulting mixture during the course of mixing manifests thixotropy temporarily and loses fluidity substantially completely but eventually gives rise to a liquid of low viscosity on the order of 2 to 100 poises suitable for cast molding even when the inorganic filler (B) is used in an amount of 250 up to about 500 parts by weight, based on 100 parts by weight of the monomer mixture (A).

When the mixing is effected by the use of a low-speed mixer such as a two-arm kneader, the mixture gradually assumes the form of a doughlike viscous mass as the amount of the inorganic filler (B) added is increased, continuous to retain this form, and eventually gives rise to a doughlike mass excelling in fluidity under pressure even when the amount of the inorganic filler (B) added is increased to the level of about 800 parts by weight, based on 100 parts by weight of the monomer mixture (A).

Various methods are available for the dispersion of the inorganic filler (B) in the monomer mixture (A), one method resorting to use of a various high-speed stirrer, another method to use of a low-speed kneader, and yet another method to use of a pigment disperser or kneading roll generally adopted in the preparation of coating materials. Particularly for the production of a curable composition in the form of a low-viscosity liquid suitable for cast molding, a high-speed stirrer such as a disperser or a homo-mixer which rotates at a rate exceeding 1,000 r.p.m., preferably falling in the range of 1,100 to 1,500 r.p.m. can be advantageously used. For the production of the curable composition in the form of a doughlike mass suitable for compression molding, a low-speed kneader which effects the kneading by the use of stirring blades, screws, rolls or plates at a speed of not more than 100 r.p.m. can be advantageously used. Examples of the low-speed kneader meeting the requirement include two-arm kneader, muller type kneader, internal mixer, paddle mixer, (cokneader), stirring blade type mixer, cake mixer, pony mixer, roll mill, and screw type extruder.

The curable composition obtained in the form of a low-viscosity liquid or the form of a doughlike mass as described above can be easily cured by the cast molding or the molding under simultaneous application of heat and pressure. Particularly when the curable composition uses aluminum hydroxide in an amount of 250 to 400 parts by weight based on 100 parts by weight of the monomer mixture (A), it produces a translucent milk-white artificial marble of good appearance. When the curable composition uses aluminum hydroxide in an amount of 400 to 800 parts by weight, it produces a milk-white artificial marble possessing high flame retardance.

The amount of the inorganic filler (B) to be used falls in the range of 250 to 800 parts by weight, based on 100 parts by weight of the monomer mixture (A). Particularly for the production of a curable composition in the form of a low-viscosity liquid, the amount of the inorganic filler (B) is required to fall in the range of 250 to 500 parts by weight, preferably 300 to 400 parts by weight. For the production of the curable composition in the form of a doughlike mass, the amount of the inorganic filler (B) is required to fall in the range of 250 to 800 parts by weight, preferably 300 to 600 parts by weight. If the inorganic filler is used in an amount of less than 250 parts by weight, the curable composition is incapable of producing a cured article excelling in thermal stability and hydrothermal stability and exhibiting flame retardance. If the inorganic filler is used in an amount exceeding 800 parts by weight, the dispersion of the inorganic filler (B) in the monomer mixture (A) is so difficult that the preparation of a curable composition capable of affording a cured product excelling in hydrothermal stability is virtually impracticable. Further, when the curable composition using therein the inorganic filler (B) in an amount exceeding 500 parts by weight is used in impregnating reinforcing fibers or reinforcing short fibers or is combined with such fibers, the impregnation or the combination is not obtained sufficiently and the cured molded article consequently obtained fails to acquire high hydrothermal stability and high mechanical strength.

A silane coupling agent used during the mixing of the monomer mixture (A) with the inorganic filler (B) brings about a desirable result of enhancing the waterproofness of the cured product consequently obtained. As typical examples of the silane coupling agent, there can be cited γ-methacryloxy propyltrimethoxy silane, γ-glycidoxy propyltrimethoxy silane, vinyltriethoxy silane, and vinyltriacetoxy silane. Desirably, the silane coupling agent is used in amount of 0.1 to 2.0%, preferably 0.2 to 1.0%, based on the weight of the inorganic filler (B) as dissolved or dispersed in the aforementioned monomer mixture (A) or as incorporated in an agent used for pretreating the inorganic filler (B).

Examples of the polymerization initiator to be used in the present invention include organic peroxide such as benzoyl peroxide, cyclohexanone peroxide, methylethyl ketone peroxide, bis(4-t-butyl cyclohexyl) peroxy dicarbonate, t-butyl peroxy benzoate, and t-butyl peroxy octoate and azo compounds. Among other polymerization initiators enumerated above, t-butyl peroxy octoate and benzoyl peroxide which are medium to high temperature polymerization initiators which gives cured products of high transparency without inducing a crack prove particularly desirable. Where the curable composition is to be molded at low temperatures as involved in the cold press method or the resin injection method, such medium to low temperature polymerization initiators as methylethyl ketone peroxide, cyclohexanone peroxide, and bis(4-t-butyl cyclohexyl) peroxy dicarbonate can be used independently or as combined with an organic amine or a salt of polyvalent metal as a promoter. For the purpose of cast molding, bis(4-t-butyl cyclohexyl) peroxy dicarbonate (product of Nippon Kayaku Co., Ltd. and marketed under trademark designation of "Parcadox PX-16") is used particularly desirable. Generally, the polymerization initiator is used in an amount of 0.2 to 3.0%, preferably 0.5 to 2.0% based on the weight of the monomer mixture (A).

In the preparation of the curable composition, besides the monomer mixture (A), the inorganic filler having an average particle diameter of not more than 5 microns (B), and the polymerization initiator (C), such additives as various filler, mold release agent such as zinc stearate, thixotropic agent, plasticizer, flame-retardant or flame-resisting agent, and coloring agent may be used in amounts incapable of impairing the effect of this invention.

The curable composition of the present invention obtained as described above can be cured into various products by application of heat. The curable composition in the form of a low-viscosity liquid, for example, is converted into cast molded articles of various shapes when it is cast in desired shapes and then cured by application of heat. In the case of the cast molding, desired products are obtained by performing preliminary curing at temperatures of about 60° C., for example, and continuing after curing when necessary at elevated temperatures of 80° to 120° C. The curable composition in the form of a doughlike mass, is converted into press molded articles of various shapes when it is cured under application of heat and pressure by various pressure molding methods such as press, injection, extrusion, and transfer molding methods. In the case of the press molding under simultaneous application of heat and pressure, desired products are obtained by effecting the curing under pressure in the range of 5 to 200 kg/cm$^2$, preferably 10 to 150 kg/cm$^2$ at a mold temperature in the range of 80° to 180° C., preferably 100° to 150° C.

The curable composition of this invention can be applied in combination with reinforcing fibers to various FRP molding methods such as hand lay up, spray up, cold press, resin injection, matched metal die, drawing, and filament winding. In this case, desired FRP products are obtained by pouring the curable composition onto the reinforcing fibers until impregnation and then curing the impregnated reinforcing fibers or by keeping the reinforcing fibers immersed in the curable composition until impregnation and subsequently curing the impregnated reinforcing fibers. The curing temperature which is variable with the method of molding or by the kind of polymerization initiator generally ranges from normal room temperature to the neighborhood of 150° C.

Glass fibers are generally used as the reinforcing fibers. Carbon fibers and polyamide fibers are also usable. They are used in the form of non-woven fabric, woven fabric, chopped mat, or continuous fiber mat either singly or in a mixed state.

The amount of the reinforcing fibers is not specifically limited but is suitably fixed depending on the nature of use found for FRP molded products or on the mechanical strength required. Generally, it is in the range of 5 to 70 parts by weight, preferably 10 to 50 parts by weight based on 100 parts by weight of the curable composition.

The curable composition of the present invention can be converted into a premix molding material when it is intimately mixed with reinforcing short fibers until impregnation. Alternatively, this premix molding material can be obtained by adding the reinforcing short fibers to the system in which the monomer mixture (A) is being mixed with the inorganic filler (B) and the polymerization initiator (C) so as to effect the actions of dispersion, impregnation, and intimate mixture all at once. The method which comprises adding the reinforcing short fibers to the curable composition proves more desirable because it permits thorough mixing of the inorganic filler and prevents the reinforcing short fibers from unwanted breakage.

Examples of the reinforcing short fibers are glass fibers, carbon fibers, polyamide fibers, and various grades of whiskers which come in relatively small lengths of not more than 12 mm.

Although the amount of the reinforcing short fibers to be used is not specifically limited and is suitably fixed depending on the nature of use found for the cured product obtained from the premix molding material or on the mechanical strength required, it generally falls in the range of 5 to 50 parts by weight, preferably 10 to 25 parts by weight based on 100 parts by weight of the curable composition.

This premix molding material is in the form of a mass which possesses proper toughness, lacks tackiness, and offers ease of handling. It can be molded and cured by various methods resorting to simultaneous application of heat and pressure such as extrusion molding, press molding, injection molding, and transfer molding methods. Specifically, when it is molded in a matched metal die or an extruder heated to 100° to 160° C., it can be converted into a FRP molded product excelling in surface luster.

The curable composition of the present invention which incorporates therein the aforementioned thickening thermoplastic polymer can be converted into such fiber-reinforced thermosetting molding materials as sheet molding compound (SMC) and bulk molding compound (BMC) when it is combined with a thickener and allowed to impregnate reinforcing fibers.

As the thickener, such metal oxide or metal hydroxide as magnesium oxide or magnesium hydroxide is used for the thickening thermoplastic polymer possessing two or more carboxyl groups in the molecular unit thereof. For the thickening thermoplastic polymer possessing two or more hydroxyl groups in the molecular unit thereof, a polyfunctional isocyanate compound represented by tolylene diisocyanate or isopholone diisocyanate is used.

This thickener acts on the thickening thermoplastic polymer and increases the viscosity of the curable composition enough for the composition to acquire satisfactory workability during the course of the impregnation of the reinforcing fibers and the subsequent course of aging.

The amount of the thickener to be used is suitably fixed depending on the extent of increase of the viscosity required. Generally, it falls in the range of 0.1 to 10 parts by weight, preferably 0.5 to 5 parts by weight, based on 100 parts by weight of the monomer mixture (A). As regards the time of addition of the thickener, the thickener may be added simultaneously with the inorganic filler (B) to the monomer mixture (A). For the curable composition of a high filler content to acquire a satisfactory ability to impregnate reinforcing fibers, however, it is desirable to add the thickener to the curable composition after the curable composition has been produced by adding the inorganic filler (B) and the polymerization initiator to the monomer mixture (A) and stirring the resulting mixture for thorough dispersion of the inorganic filler and immediately before reinforcing fibers are impregnated with the curable composition.

The fiber reinforced thermosetting molding material is produced by simply impregnating reinforcing fibers with the curable composition which has incorporated therein a thickener. To be more specific, SMC can be produced by impregnating reinforcing fibers with the curable composition through mutual intimate contact and when necessary allowing the impregnated reinforcing fibers to age and gain in viscosity. In contrast, BMC can be produced by adding reinforcing fibers at the time that the monomer mixture (A) is mixed with the inorganic filler (B) so as to effect the actions of mixture and impregnation at once. In the case of BMC, the addition of reinforcing fibers is desired to be made after the mixing of the inorganic filler (B) with the monomer mixture (A) has proceeded thoroughly to ensure thorough dispersion of the inorganic filler (B) and perfect prevention of the reinforcing fibers from unwanted breakage.

Examples of reinforcing fibers which are usable in the preparation of SMC and BMC include various organic and inorganic materials such as glass fibers, carbon fibers, polyamide fibers, and various grades of whiskers.

The amount of such reinforcing fibers to be used is not specifically limited but is suitably fixed to suit the nature of use found for the molding material or the mechanical strength required of the cured product. Generally, it falls in the range of 5 to 70 parts by weight, preferably 10 to 50 parts by weight, based on 100 parts by weight of the curable composition.

These molding materials, SMC and BMC, are produced by impregnating reinforcing fibers with the curable composition and allowing the impregnated reinforcing fibers to age and gain in viscosity. Thus, they are free from tackiness and offer satisfactory workability.

To obtain a shaped article by curing the fiber reinforced thermosetting molding material, various methods of molding by simultaneous application of heat and pressure such as extrusion molding, press molding, injection molding, and transfer molding methods which have been adopted for the conventional SMC and BMC are available.

When aluminum hydroxide is selected as the inorganic filler (B), the curable composition of the present invention is highly useful for the manufacture of translucent to milk-white artificial marbles of good appearance to be fabricated into bathtubs, kitchen counters and the like. The artificial marbles obtained by curing the curable composition through cast molding or simultaneous application of heat and pressure are articles of good appearance which are sparingly flammable because of their inclusion of the inorganic filler (B) in a highly packed state, retain their good appearance intact even after more than 500 hours' standing in boiling water, possess high heat distortion points, and show outstanding results in tests for resistance to deposition of defiling substances such as cigarette tar. Particularly, those shaped articles of artificial marble which are obtained by thermally molding the curable composition in the form of a doughlike mass under application of pressure possess high dimensional accuracy, yield minimally to distortion, retain excellent surfaces free from the possibility of sustaining cracks, and abound with productivity.

Further, the cured products obtained by curing the curable composition of the present invention exhibit outstanding performance in flame retardance, thermal resistance, and hydrothermal resistance and, therefore, can be used safely in applications to bathtubs, waterproof pans, kitchen counters, ducts, electric parts, automobile parts, and tableware which the conventional curable composition has failed to satisfy because of its deficiency in flame retardance, thermal stability, and hydrothermal stability.

Now, the present invention will be described more specifically below with reference to working examples. It should be noted, however, that these working examples do not represent the whole scope of the present invention.

EXAMPLE 1

A liquid monomer mixture was prepared by mixing 50 parts by weight of trimethylol propane trimethacrylate, 50 parts by weight of styrene, and 0.5 part by weight of a silane coupling agent (produced by Shinetsu Chemical Industry Co., Ltd. and marketed under product code of "KBM-503"). Then, in the liquid monomer mixture, 300 parts by weight of aluminum hydroxide having an average particle diameter of 3.5 microns (produced by Showa Light Metal Industries, Ltd. and marketed under trademark designation of "HIGILITE H-320") was dispersed with a high-speed stirrer (produced by Asada Iron Works and marketed under trademark designation of "DESPA ®") at a rotational rate of 1,100 r.p.m. for 20 minutes. Subsequently, the resulting mixture was mixed with 0.8 part by weight of a polymerization initiator, bis(4-t-butylcyclohexyl)-peroxy dicarbonate (produced by Nippon Kayaku Co., Ltd. and marketed under trademark designation of "Parkadocks PX-16"), to obtain a curable composition (1) of the present invention. This curable composition (1) showed viscosity of 19 poises at 30° C.

Then, this curable composition (1) was poured into a casting mold 200×150×6 mm and cured at 45° C. for 55 minutes. It was subjected to a post curing at 120° C. for 2 hours. The cured plate had a marblelike translucent texture emitting a beautiful milk-white light and possessing flame retardance. The properties of this plate are shown in Table 1. It is noted from this table that the plate possessed a high heat distortion point and excelled in resistance to deposition of defiling substance.

EXAMPLE 2

A liquid monomer mixture was prepared by mixing 70 parts by weight of trimethylol propane trimethacrylate, 30 parts by weight of styrene, and 0.5 part by weight of a silane coupling agent (produced by Shin-etsu Chemical Industry Co., Ltd. and marketed under product code of "KBM-503"). Then, in the liquid monomer mixture, 300 parts by weight of aluminum hydroxide having an average particle diameter of 2.5 microns (produced by Sumitomo Chemical Co., Ltd. and marketed under product code of "CE-30E") was dispersed with a high-speed stirrer (produced by Asada Iron Works and marketed under trademark designation of "DESPA ®") at a rotational rate of 1,100 r.p.m. for 20 minutes.

Subsequently, the resulting mixture was mixed with 0.8 part by weight of a polymerization initiator, bis(4-t-butylcyclohexyl)peroxy dicarbonate (produced by Nippon Kayaku Co., Ltd. and marketed under trademark designation of "Parkadocks PX-16"), to obtain a curable composition (2) of this invention. This curable composition (2) showed viscosity of 56 poises at 30° C.

Then, the curable composition (2) was poured into a casting mold 200×150×6 mm, cured at 45° C. for 50 minutes, and further subjected to a post curing at 120° C. for 2 hours. The cured plate had a marblelike translucent texture scattering a beautiful milk-white light and possessing flame retardance. The properties of this plate had a high heat distortion point and excelled in resistance to deposition of defiling substance.

EXAMPLE 3

A liquid monomer mixture was prepared by mixing 50 parts by weight of trimethylol propane trimethacrylate and 50 parts by weight of styrene. Then, in this liquid monomer mixture, 400 parts by weight of aluminum hydroxide having an average particle diameter of 3.0 microns (produced by Showa Light Metal Industries, Ltd. and marketed under trademark designation of "HIGILITE H-320ST") was dispersed with a high-speed stirrer (produced by Asada Iron Works and marketed under trademark designation of "DESPA ®") at a rotational rate of 1,300 r.p.m. for 30 minutes.

Subsequently, the resulting mixture was mixed with 0.8 part by weight of a polymerization initiator, bis(4-t-butylcyclohexyl)peroxy dicarbonate (produced by Nippon Kayaku Co., Ltd. and marketed under trademark designation of "Parkadocks PX-16"), to obtain a curable composition (3) of this invention. This curable composition (3) showed viscosity of 37 poises at 30° C.

Then, this curable composition (3) was poured into a casting mold 200×150×6 mm, cured at 45° C. for 50 minutes, and further subjected to a post curing at 120° C. for 2 hours. The cured plate had a marblelike translucent texture scattering a beautiful milk-white light and possessing flame retardance. The properties of this plate are shown in Table 1. From this table, it is noted that the plate had a high heat distortion point and excelled in resistance to deposition of defiling substance.

EXAMPLE 4

A liquid monomer mixture was prepared by mixing 40 parts by weight of trimethylol propane trimethacrylate, 40 parts by weight of styrene, and 20 parts by weight of isobutyl methacrylate. Then, in this liquid monomer mixture, 400 parts by weight of aluminum hydroxide having an average particle diameter of 3.0 microns (produced by Showa Light Metal Industries, Ltd. and marketed under trademark designation of "HIGILITE H-320ST") was dispersed with a high-speed stirrer (produced by Asada Iron Works and marketed under trademark designation of "DESPA ®") at a rotational rate of 1,300 r.p.m. for 30 minutes.

Subsequently, the resulting mixture was mixed with 0.8 part by weight of a polymerization initiator, bis(4-t-butylcyclohexyl)peroxy dicarbonate (produced by Nippon Kayaku Co., Ltd. and marketed under trademark designation of "Parkadocks PX-16"), to obtain a curable composition (4) of this invention. This curable composition (4) showed viscosity of 33 poises at 30° C.

Then, the curable composition (4) was poured into a casting mold 200×250×6 mm, cured at 45° C. for 45 minutes, and further subjected to a post curing at 120° C. for 2 hours. The cured plate had a marblelike translucent texture scattering a beautiful milk-white light and possessing flame retardance. The properties of this plate are shown in Table 1. It is noted from the table that this plate had a high heat distortion point and excelled in resistance to deposition of defiling substance.

EXAMPLE 5

A liquid monomer mixture was prepared by mixing 40 parts by weight of dipentaerythritol hexamethacrylate, 60 parts by weight of styrene, and 0.5 part by weight of a silane coupling agent (produced by Shin-etsu Chemical Industry Co., Ltd. and marketed under product code of "KBM-503"). Then, in the liquid monomer mixture, 300 parts by weight of aluminum hydroxide having an average particle diameter of 3.5 microns (produced by Showa Light Metal Industries, Ltd. and marketed under trademark designation of "HIGILITE H-320") was dispersed with a high-speed stirrer (produced by Asada Iron Works and marketed under trademark designation of "DESPA ®") at a rotational rate of 1,100 r.p.m. for 20 minutes.

Subsequently, the resulting mixture was mixed with 0.8 part by weight of a polymerization initiator, bis(4-t-butylcyclohexyl)peroxy dicarbonate (produced by Nippon Kayaku Co., Ltd. and marketed under trademark designation of "Parkadocks PX-16"), to obtain a curable composition (5). This curable composition (5) showed viscosity of 67 poises at 30° C.

Then, the curable composition (5) was poured into a casting mold 200×150×6 mm, cured at 45° C. for 40 minutes, and further subjected to a post curing at 120° C. for 2 hours. The cured plate had a marblelike translucent texture scattering a beautiful milk-white light and possessing flame retardance. The properties of this plate are shown in Table 1. It is noted from this table that this plate has a high heat distortion point and excelled in resistance to deposition of defiling substance.

EXAMPLE 6

A liquid monomer mixture was prepared by mixing 30 parts by weight of trimethylol propane trimethacrylate, 70 parts by weight of styrene, 0.5 part by weight of a silane coupling agent (produced by Shin-etsu Chemical Industry Co., Ltd. and marketed under product code of "KBM-503"), and 0.5 part by weight of t-butylperoxyoctoate (produced by Nippon Oils & Fats Co., Ltd. and marketed under trademark designation of "Perbutyl O"). Then, in a two-arm kneader (produced by Moriyama MFG Works Ltd. and marketed under product code of "MS Open Type"), the liquid monomer mixture, 300 parts by weight of aluminum hydroxide having an average particle diameter of 3.5 microns (produced by Showa Light Metal Industries, Ltd. and marketed under trademark designation of "HIGILITE H-320"), and 3 parts by weight of zinc stearate were kneaded, with the front blade rotated at 68 r.p.m. and the rear blade at 38 r.p.m. for about 5 minutes until the resultant blend formed a doughlike mass, to obtain a curable composition (6) of this invention. This curable composition was found, by measurement with a B type helipass rotary viscosimeter, to possess viscosity of 42,000 poises at 30° C. Then, this molding material was introduced into a press molding die 200×200×6 mm and cured at 100° C. under 130 kg/cm² for 8 minutes. The press molded plate had a marble-like translucent texture scattering a beautiful milk-white light and possessing flame retardance. The properties of this plate are shown in Table 1. It is noted from this table that this plate had a high heat distortion point and excelled in resistance to deposition of defiling substance.

EXAMPLE 7

A liquid monomer mixture was prepared by mixing 30 parts by weight of trimethylol propane trimethacrylate, 70 parts by weight of styrene, 0.5 part by weight of a silane coupling agent (produced by Shin-etsu Chemical Industry Co., Ltd. and marketed under product code of "KBM-503"), 0.5 part by weight of t-butylperoxyoctoate (produced by Nippon Oils & Fats Co., Ltd. and marketed under trademark designation of "Perbutyl O"). Then, in a two-arm kneader (produced by Moriyama MFG Works Ltd. and marketed under product code of "MS Open Type"), the liquid monomer mixture, 300 parts by weight of magnesium hydroxide having an average particle diameter of 0.8 micron (produced by Kyowa Chemical Industry Co., Ltd. and marketed under trademark designation of "Kisuma ® 5E), and 3 parts by weight of zinc stearate were kneaded, with the front blade rotated at 68 r.p.m. and the rear blade at 38 r.p.m., for about 5 minutes until the resultant blend formed a doughlike mass, to obtain a curable composition (7) of this invention. This curable composition was found, by measuring with a B type helipass rotary viscosimeter, to possess viscosity of 60,000 poises at 30° C. Then, the molding material was introduced into a press molding die 200×200×6 mm and cured at 100° C. under 130 kg/cm² for 8 minutes. The press molded plate had a marblelike translucent texture scattering a beautiful milk-white light and possessing flame retardance. The properties of this plate are shown in Table 1. It is noted from this table that this plate had a high distortion point and excelled in resistance to deposition of defiling substance.

EXAMPLE 8

A liquid monomer mixture prepared by mixing 30 parts by weight of trimethylol propane trimethacrylate, 70 parts by weight of styrene, 0.5 part by weight of a silane coupling agent (produced by Shin-etsu Chemical Industry Co., Ltd. and marketed under product code of "KBM-503"), and 0.5 part by weight of t-butyl-peroxyoctoate (produced by Nippon Oils & Fats Co., Ltd. and marketed under trademark designation of "Perbutyl O"). Then, in a two-arm kneader (produced by Moriyama MFG Works Ltd. and marketed under product code of "MS Open type"), the liquid monomer mixture, 260 parts by weight of calcium carbonate having an average particle diameter of 2.1 microns (produced by Nitto Pulverizing Industry Co., Ltd. and marketed under product code of "NS-100"), and 3 parts by weight of zinc stearate were kneaded, with the front blade rotated at 68 r.p.m. and the rear blade at 38 r.p.m. for about 5 minutes until the resulting blend formed a doughlike mass, to obtain a curable composition (8). This curable composition was found, by measurement with a B type helipass viscosimeter, to possess viscosity of 65,000 poises at 30° C. Then, this molding material was introduced into a press molding die 200×200×6 mm and cured at 100° C. under 130 kg/cm² for 8 1 minutes. The press molded plate had a marblelike translucent texture scattering a beautiful yellowish light. The properties of the plate are shown in Table 1. It is noted from the table that this plate had a high heat distortion point and excelled in resistance to deposition of defiling substance.

CONTROL 1

A methyl methacrylate syrup having viscosity of 5 poises was obtained by dissolving 27 parts by weight of polymethyl methacrylate (produced by Mitsubishi Rayon and marketed under trademark designation of "Acrypet MD001") in 73 parts by weight of methyl methacrylate. Then, in this syrup, 200 parts by weight of aluminum hydroxide having an average particle diameter of 17 microns (produced by Showa light Metal Industries, Ltd. and marketed under trademark designation of "HIGILITE H-310") was dispersed with a high-speed stirrer (produced by Asada Iron Works and marketed under trademark designation of "DESPA ®") at a rotational rate of 1,100 r.p.m. for 20 minutes. The resulting dispersion was mixed with 0.8 part by weight of a polymerization initiator (produced by Nippon Kayaku Co,. ltd. and marketed under trademark designation of "Parkadocks PX-16") to obtain a curable resin composition for comparison. This resin composition had viscosity of 230 poises at 30° C. Even when it was deaerated under a vacuum, it still retained bubbles. Because of poor fluidity, the resin composition was cast in a mold with difficulty. This resin composition was poured into a casting mold 200×150×6 mm and cured at 45° C. for 50 minutes and further subjected to a post curing at 110° C. for 2 hours. The properties of the cured plate are shown in Table 1. It is noted from the table that the plate was deficient in thermal stability and hydrothermal stability.

CONTROL 2

A resin composition for comparison was obtained by mixing 100 parts by weight of vinyl ester resin (obtained by dissolving 55 parts by weight of bisphenol-A type epoxy acrylate resin in 45 parts by weight of styrene) with 0.5 part by weight of a silane coupling agent (produced by Shin-etsu Chemical Industry Co., Ltd. and marketed under product code of "KBM-503"), dispersing in the resulting resin solution 200 parts by weight of aluminum hydroxide having an average particle diameter of 17 microns (produced by Showa Light Metal Industries, Ltd. and marketed under trademark designation of "HIGILITE H-310") with a high-speed stirrer (produced by Asada Iron Works and marketed under trademark designation of "DESPA ®") at a rotational rate of 1,100 r.p.m. for 20 minutes, and then mixing the resulting dispersion with 0.8 part by weight of a polymerization initiator (produced by Nippon Kayaku Co., Ltd. and marketed under trademark designation of "Parkadocks PX-16"). This resin composition had viscosity of 180 poises at 30° C. Even after it was deaerated under a vacuum, it still retained numerous bubbles. Because of poor fluidity, this resin composition was poured into a casting mold with difficulty. This resin composition was poured into a casting mold 200×150×6 mm, cured at 45° C. for 60 minutes, and further subjected to a post curing at 110° C. for 2 hours. The properties of the cured plate are shown in Table 1. It is noted from the table that this resin composition was deficient in thermal stability and hydrothermal stability.

and 60 parts by weight of styrene with 3 parts by weight of zinc stearate as an inner mold release agent, 0.8 part by weight of t-butyl peroxyoctoate as a polymerization initiator, and 0.5 part by weight of a silane coupling agent (produced by Shin-etsu Chemical Industry Co., Ltd. and marketed under product code of "KBM-503"). In the liquid monomer mixture, 600 parts by weight of aluminum hydroxide having an average particle diameter of 3.5 microns (produced by Showa Light Metal Industries, Ltd. and marketed under trademark designation of "HIGILITE H-320") was kneaded with a two-arm kneader (produced by Moriyama MFG Works Ltd.

TABLE 1

| Properties of cured product | | Example | | | | | | | | Control | |
|---|---|---|---|---|---|---|---|---|---|---|---|
| | | 1 | 2 | 3 | 4 | 5 | 6 | 7 | 8 | 1 | 2 |
| Heat distortion point (°C.) (ASTM D0648) | | 220 | 220 | 220 | 190 | 220 | 200 | 200 | 195 | 105 | 100 |
| Hydrothermal stability (500 hours' immersion in boiling water) | | No change | " | " | " | " | " | " | " | Blush in 20 hours | Blush in 18 hours |
| Resistance to deposition of defiling substance (*) | Rouge | o | o | o | o | o | o | o | o | o | o |
| | Magic ink (black) | o | o | o | o | o | o | o | o | Δ | o |

(*) A smear deposited on a sample was wiped with detergent (kitchen grade made by Lion Fat & Oil Co., Ltd. and marketed under trademark designation of "Mamma Royal") after 24 hours' standing at 20° C. The degree of smear was rated by a three-point scale, o, Δ, and x.

EXAMPLE 9

A liquid monomer mixture was prepared by dissolving 18 parts by weight of polymethyl methacrylate (produced by Mitsubishi Rayon Co., Ltd. and marketed under trademark designation of "Acrypet MD001") in 18 parts by weight of trimethylol propane trimethacrylate and 64 parts by weight of styrene and mixing the resulting solution with 3 parts by weight of zinc stearate as an inner mold release agent, 0.8 part by weight of t-butyl peroxyoctoate as a polymerization initiator, and 0.5 part by weight of silane coupling agent (produced by Shin-etsu Chemical Industry Co,. Ltd. and marketed under product code of "KBM-503"). Then, in the liquid monomer mixture, 300 parts by weight of aluminum hydroxide having an average particle diameter of 3.5 microns (produced by Showa Light Metal Industries, Ltd, and marketed under trademark designation of "HIGILITE H-320") was kneaded with a two-arm kneader (produced by Moriyama MFG Works Ltd. and marketed under product code of "MS Open Type"), with the front blade rotated at 68 r.p.m. and the rear blade at 38 r.p.m. for about 5 minutes until the resulting blend formed a doughlike mass, to obtain a curable composition (9) of this invention.

The curable composition (9) obtained in the form of a mass was not so viscid as to stick to hands. The mass was cut with a knife to separate a 2-kg piece and this piece was introduced in a box-shaped metal die 270×380 mm in bottom area and 80 mm in height and then press molded at 120° C. under pressure of 60 tons for 5 minutes. Consequently, there was obtained a beautiful box-shaped cured product excellent in surface luster, deep in milk-white translucency, and free from crack or distortion. The properties of this molded product are shown in Table 2. It is noted from the table that the product had a high heat distortion point and excelled in resistance to deposition of defiling substance.

EXAMPLE 10

A liquid monomer mixture was obtained by mixing 40 parts by weight of trimethylol propane trimethacrylate and 60 parts by weight of styrene with 3 parts by weight of zinc stearate as an inner mold release agent, 0.8 part by weight of t-butyl peroxyoctoate as a polymerization initiator, and 0.5 part by weight of a silane coupling agent (produced by Shin-etsu Chemical Industry Co., Ltd. and marketed under product code of "KBM-503"). In the liquid monomer mixture, 600 parts by weight of aluminum hydroxide having an average particle diameter of 3.5 microns (produced by Showa Light Metal Industries, Ltd. and marketed under trademark designation of "HIGILITE H-320") was kneaded with a two-arm kneader (produced by Moriyama MFG Works Ltd. and marketed under product code of "MS Open Type"), with the front blade rotated at 68 r.p.m. and the rear blade at 38 r.p.m. until the resulting blend formed a doughlike mass for about 10 minutes, to obtain a curable composition (10) of the present invention.

The curable composition (10) obtained in the form of a mass was not so viscid as to stick to hands. It was cut with a knife to separate a 2-kg piece and this piece was introduced into a box-shaped metal die having a bottom area of 270×380 mm and a height of 80 mm and press molded at 110° C. under pressure of 60 tons for 5 minutes. Consequently, there was obtained a beautiful box-shaped cured product excellent in surface luster, deep in milk-white translucency, and free from crack or distortion. The properties of this molded product are shown in Table 2. it is noted from the table that the product had a high heat distortion point and excelled in resistance to deposition of defiling substance.

EXAMPLE 11

A liquid monomer mixture was obtained by dissolving 20 parts by weight of liquid maleic polyisoprene having an average molecular weight of 25,000 and containing 3.5 carboxyl groups per 100 isoprene units (produced by Kuraray Co., Ltd. and marketed under trademark designation of "Kuraprene") as a thickening polymer in 25 parts by weight of trimethylol propane trimethylacrylate and 55 parts by weight of styrene and then mixing the resulting solution with 3 parts by weight of zinc stearate as an inner mold release agent, 0.8 part by weight of t-butyl peroxyoctoate as a polymerization initiator, and 0.5 part by weight of a silane coupling agent (produced by Shin-etsu Chemical Industry Co., Ltd. and marketed under product code of "KBM-503"). Then, this liquid monomer mixture was kneaded in a two-arm kneader (produced by Moriyama MFG Works Ltd. and marketed under product code of "MS Open Type"), with the front blade rotated at 68 r.p.m. and the rear blade at 38 r.p.m. and 300 parts by weight of aluminum hydroxide having an average particle diameter of 3.5 microns (produced by Showa Light Metal Industries, Ltd. and marketed under trademark designation of "HIGILITE H-320") was added to the kneaded liquid monomer mixture and the kneading was continued for about 5 minutes until the resulting blend formed a doughlike mass. Subsequently, the resulting blend and 1.0 part by weight of magnesium oxide (produced by Kyowa Chemical Industry Co., Ltd. and marketed under trademark designation of "Kyowamag #20") added thereto were mixed to produce a curable composition (11) of this invention.

The curable composition (11) obtained in the form of a mass was not so viscid as to stick to hands. It was cut with a knife to separate a 2-kg piece and this piece was introduced into a box-shaped metal die having a bottom area of 270×380 mm and a height of 80 mm and press molded at 120° C. under pressure of 60 tons for 5 minutes. Consequently, there was obtained a beautiful box-shaped cured product excellent in surface luster, deep in milk-white translucency, and free from crack or distortion. The properties of this molded product are shown in Table 2. It is noted from the table that the product had a high heat distortion point and excelled in resistance to deposition of defiling substance.

EXAMPLE 12

A liquid monomer mixture was prepared by dissolving 10 parts by weight of polystyrene (produced by Sumitomo Chemical Co., Ltd. and marketed under trademark designation of "S-bright T-2 Beads") as a low-shrinkage polymer in 30 parts by weight of trimethylol propane trimethacrylate and 60 parts by weight of styrene and then mixing the resulting solution with 3 parts by weight of zinc stearate as an inner mold release agent, 0.8 part by weight of t-butyl peroxyoctoate as a polymerization initiator, and 0.5 part by weight of a silane coupling agent (produced by Shin-etsu Chemical Industry Co., Ltd. and marketed under product code of "KBM-503"). Then, the liquid monomer mixture was kneaded in a two-arm kneader (produced by Moriyama MFG Works Ltd. and marketed under product code of "MS Open Type"), with the front blade rotated at 68 r.p.m. and the rear blade at 38 r.p.m. and 300 parts by weight of aluminum hydroxide having an average particle diameter of 3.5 microns (produced by Showa Light metal Industries, Ltd. and marketed under trademark designation of "HIGILITE H-320") was added to the kneaded liquid monomer mixture and the kneading was continued for about 5 minutes until the resulting blend formed a doughlike mass, to produce a curable composition (12) of the present invention.

The curable composition (12) obtained in the form of a mass was not so viscid as to stick to hands. It was cut with a knife to separate a 2-kg piece and this piece was introduced into a box-shaped metal die having a bottom area of 270×380 mm and a height of 80 mm and press molded at 120° C. under pressure of 60 tons for 5 minutes. Consequently, there was obtained a beautiful box-shaped cured product excellent in surface luster, deep in milk-white translucency, and free from crack or distortion. The properties of this molded product had a high heat distortion point and excelled in resistance to deposition of defiling substance.

CONTROL 3

An unsaturated polyester resin solution was prepared by dissolving 45 parts by weight of an unsaturated polyester obtained by condensing 0.7 mol of maleic anhydride, 0.3 mol of isophthalic acid, 0.3 mol of neopentyl glycol, 0.6 mol of propylene glycol, and 0.15 mol of hydrogenated bisphenol A in 45 parts by weight of styrene and adding 0.005 part by weight of hydroquinone as a stabilizer to the resulting solution. A curable resin composition for comparison was obtained by dissolving 10 parts by weight of polystyrene (produced by Sumitomo Chemical Co., Ltd. and marketed under trademark designation of "S-bright T-2 Beads") as a low-shrinkage polymer in this resin solution and then mixing the resulting solution with 3 parts by weight of zinc stearate as an inner mold release agent, 0.8 part by weight of t-butyl peroxyoctoate as a polymerization initiator, 0.5 part by weight of a silane coupling agent (produced by Shin-etsu Chemical Industry Co., Ltd. and marketed under product code of "KBM-503"), and 210 parts by weight of aluminum hydroxide having an average particle diameter of 17 microns (produced by Showa Light metal Industries, Ltd. and marketed under trademark designation of "HIGILITE H-310") with a two-arm kneader similarly to Example 9. The curable composition thus obtained for comparison was so viscid as to stick to hands and, therefore, was deficient in workability.

When the amount of the aluminum hydroxide added exceeded 210 parts by weight, the upper limit of this amount for enabling the produced blend to form one whole mass was found to be 250 parts by weight. When the aluminum hydroxide was added in any amount exceeding 250 parts by weight, the produced blend separated into lumps devoid of viscosity.

A molded product was obtained by press molding the resin composition for comparison by following the procedure of Example 9. The properties of this molded product are shown in Table 2. It is noted from the table that this molded product was deficient in thermal stability and hydrothermal stability.

TABLE 2

| Physical properties of molded product | Example 9 | Example 10 | Example 11 | Example 12 | Control 3 |
|---|---|---|---|---|---|
| Appearance | Milk-white A little opacity | Milk-white Opacity | Milk-white A little opacity | Milk-white Opacity | Milk-white Opacity |
| Crack | none | none | none | none | none |
| Shrinkage (%) | 0.59 | 0.65 | 0.03 | 0.32 | 0.23 |
| Heat distortion point (°C.) (ASTM D-648) | 173 | 230 | 193 | 201 | 161 |
| Hydrothermal stability (After immersing in boiling water for 500 hours') | No change | No change | No change | No change | Occurrence of whited Surface, swell and crack |
| Burning cigarette with catching fire test (left standing for 5 minutes) | No change | No change | No change | No change | Yellowing |
| Iron test (200° C., 10 minutes) | No change | No change | Slight | No change | Yellowing |

TABLE 2-continued

| Physical properties of molded product | Example 9 | Example 10 | Example 11 | Example 12 | Control 3 |
| --- | --- | --- | --- | --- | --- |
| Flame retardance (JIS D-7201) (oxygen index) | 55–60 | 58–62 | yellowing 55–60 | 55–60 | 30–35 |

EXAMPLE 13

A liquid monomer mixture was prepared by mixing 50 parts by weight of trimethylol propane trimethacrylate, 50 parts by weight of styrene, and 0.5 part by weight of a silane coupling agent (produced by Shin-etsu Chemical Industry Co., Ltd. and marketed under product code of "KBM-503"). With a high-speed stirrer (produced by Asada Iron Works and marketed under trademark designation of "DESPA$^R$"), 300 parts by weight of aluminum hydroxide having an average particle diameter of 3.5 microns (produced by Showa Light Metal Industries, Ltd. and marketed under trademark designation of "HIGILITE H-320") and 3 parts by weight of zinc stearate as an inner mold release agent were dispersed in the liquid monomer mixture at a rotational rate of 1,100 r.p.m. for 20 minutes by mixing the resulting dispersion with 0.8 part by weight of t-butyl peroxyoctoate (produced by Nippon Oils & Fats Co., Ltd. and marketed under trademark designation of "Perbutyl O") as a polymerization initiator, a curable composition (13) of the present invention was obtained. This curable composition (13) had viscosity of 19 poises at 30° C. The, a metal die (intended for production of a plate 200 mm in diameter and 10 mm in depth) set in advance in a press molder was heated to 120° C. and three chopped glass mats, #450 (450 g/m$^2$) were set in place within the metal die. The glass mats and 150 g of the curable composition (13) added thereto were pressed with pressure of 30 kg/cm$^2$ of product surface area for 3 minutes, to afford a FRP molded product of 3 mm in thickness.

The FRP molded product had a beautiful milk-white texture, though the glass matrix was visible. The properties of the FRP molded product are shown in Table 3. It is noted from the table that this product excelled in flame retardance and thermal and hydrothermal stability.

EXAMPLE 14

A liquid monomer mixture was prepared by dissolving 18 parts by weight of polymethyl methacrylate (produced by Mitsubishi Rayon Co., Ltd. and marketed under trademark designation of "Acrypet MD001") in 30 parts by weight of trimethylol propane trimethylacrylate and 52 parts by weight of styrene and mixing the resulting solution with 0.5 part by weight of a silane coupling agent (produced by Shin-etsu Chemical Industry Co., Ltd. and marketed under product code of "KBM-503"). Then, with a high-speed stirrer (produced by Asada Iron Works and marketed under trademark designation of "DESPA Ⓡ"), 300 parts by weight of aluminum hydroxide having an average particle diameter of 3.5 microns (produced by Showa Light Metal Industries, Ltd. and marketed under trademark designation of "HIGILITE H-320") and 3 parts by weight of zinc stearate as an inner mold release agent added thereto were dispersed in the liquid monomer mixture at a rotational rate of 1,100 r.p.m. for 20 minutes. The resulting dispersion was mixed with 0.8 part by weight of t-butyl peroxyoctoate (produced by Nippon Oils & Fats Co., Ltd. and marketed under trademark designation of "Perbutyl O") as a polymerization initiator to produce a curable composition (14) of the present invention. This curable composition (14) had viscosity of 86 poises at 30° C. An FRP molded product was obtained from this curable composition (14) by following the procedure of Example 13.

The FRP molded product has a beautiful milk-white texture abounding with smoothness and completely hiding the underlying glass matrix. The properties of this product are shown in Table 3. It is noted from the table that this product excelled in flame retardance and thermal and hydrothermal stability.

CONTROL 4

An unsaturated polyester resin solution was prepared by dissolving 47.5 parts by weight of an unsaturated polyester obtained by condensing 0.3 mol of isophthalic acid, 0.7 mol of maleic anhydride, 0.3 mol of neopentyl glycol, 0.6 mol of propylene glycol, and 0.15 mol of hydrogenated bisphenol A in 47.5 parts by weight of styrene and adding 0.005 part by weight of hydroquinone as a stabilizer to the resultant solution. In this resin solution, 5 parts by weight of polymethyl methacrylate (produced by Mitsubishi Rayon Co., Ltd. and marketed under trademark designation of "Acrypet MD001"), was dissolved. The resulting solution and 0.5 part by weight of a silane coupling agent (produced by Shin-etsu Chemical Industry Co., Ltd. and marketed under product code of "KBM-503"), 3 parts by weight of zinc stearate as an inner mold release agent, 0.8 part by weight of t-butyl peroxyoctoate as a polymerization initiator, and 130 parts by weight of aluminum hydroxide having an average particle diameter of 3.5 microns (produced by Showa Light Metal Industries, Ltd. and marketed under trademark designation of "HIGILITE H-320") added thereto were mixed with a high-speed stirrer (produced by Asada Iron Works and marketed under trademark designation of "DESPA Ⓡ") at a rotational rate of 1,100 r.p.m. for 20 minutes, to produce a curable resin composition. This curable resin composition had viscosity of 110 poises at 30° C. Then, a FRP molded product was produced from the resin composition for comparison by following the procedure of Example 13.

The FRP molded product for comparision thus produced had a beautiful white texture, sparingly showing the underlying glass matrix. The properties of this product are shown in Table 3. It is noted from the table that this product was deficient in thermal stability and hydrothermal stability and flame retardance.

TABLE 3

| Performance of FRP molded product | Example 13 | Example 14 | Control 4 |
| --- | --- | --- | --- |
| Iron test (200° C., 10 minutes) | No change | No change | Yellowing |
| Burning cigarette test (5 minutes' standing) | No change | No change | Yellowing |
| Hydrothermal stability (500 hours' immersion | No change | No change | Loss of luster and blushing |

TABLE 3-continued

| Performance of FRP molded product | Example 13 | Example 14 | Control 4 |
|---|---|---|---|
| in boiling water) | | | of surface |
| Flame retardance (JIS K-7201) (oxygen index) | 55–60 | 55–60 | 27–30 |

EXAMPLE 15

A liquid monomer mixture consisting of 25 parts by weight of trimethylol propane trimethacrylate and 75 parts by weight of styrene was mixed with 3 parts by weight of zinc stearate, 0.8 part by weight of t-butyl peroxyoctoate (produced by Nippon Oils & Fats Co., Ltd. and marketed under trademark designation of "Perbutyl 0") as a polymerization initiator, and 0.5 part by weight of a silane coupling agent (produced by Shin-etsu Chemical Industry Co., Ltd. and marketed under product code of "KBM-503"). The resulting liquid mixture was placed in a two-arm kneader. Then, in the kneader, 300 parts by weight of aluminum hydroxide having an average particle diameter of 3.5 microns (produced by Showa Light Metal Industries, Ltd. and marketed under trademark designation of "HIGILITE H-320") was kneaded for about 5 minutes until the resulting blend formed a doughlike mass, to produce a curable composition (15) of this invention. The curable composition (15) and 45 parts by weight of chopped glass fibers cut to a length of 6 mm were similarly kneaded for 5 minutes to produce a premix molding material. This premix molding material was a mass free from tackiness and offered desirable workability. A 2-kg piece cut with a knife from the premix molding material was placed in a box-shaped metal die (having a bottom surface area of 270×380 mm and a depth of 80 mm and kept at 120° C.) set in place in a press molder and pressed under pressure of 60 tons for 5 minutes. Consequently, there was obtained a beautiful milk-white translucent molded product excellent in surface luster and free from crack or distortion. The properties of this product are shown in Table 4. It is noted from the table that this product excelled in thermal stability and hydrothermal stability and flame retardance.

EXAMPLE 16

By dissolving 20 parts by weight of liquid maleic polyisoprene having an average molecular weight of 25,000 and containing 3.5 carboxyl groups per 100 isoprene units (produced by Kuraray Co., Ltd. and marketed under trademark designation of "Kuraprene") in a liquid monomer mixture consisting of 30 parts by weight of trimethylol propane trimethacrylate and 5 parts by weight of styrene, there was obtained 100 parts by weight of a polymeric syrup. The polymeric syrup and 0.5 part by weight of a silane coupling agent (produced by Shin-etsu Chemical Industry Co., Ltd. and marketed under product code of "KBM-503"), 1.0 part by weight of t-butyl peroxybenzoate (produced by Nippon Oils & Fats Co., Ltd. and marketed under trademark designation of "Perbutyl Z") as a polymerization initiator, 1 part by weight of zinc stearate as an inner mold release agent, and 300 parts by weight of aluminum hydroxide having an average particle diameter of 3.5 microns (produced by Showa Light Metal Industries, Ltd. and marketed under trademark designation of "HIGILITE H-320") added thereto were mixed with a high-speed stirrer (produced by Asada Iron Works and marketed under trademark designation of "DESPA ®") at a rotational rate of 1,100 r.p.m. for 20 minutes, to produce a curable composition (16) of the present invention. This curable composition (16) showed viscosity of 80 poises at 30° C. An impregnant for preparation of a sheet molding compound (SMC) was obtained by mixing this curable composition (16) with 1 part by weight of magnesium oxide (produced by Kyowa Chemical Industry Co., Ltd. and marketed under trademark designation of "Kyowamag #20") as a thickener. In a SMC producing machine, an impregnated sheet weighing 4 kg per m² and containing 25% by weight of glass chops obtained by cutting a glass roving (produced by Nitto Boseki Co., Ltd. and marketed under product code of "RS-240F-546") in length of 1 inch was produced by impregnating the glass chops with the impregnant. A SMC was obtained by allowing the impregnated sheet to age in an aging chamber at 40° C. for 20 hours. The SMC was devoid of tackiness, capable of keeping the glass fiber thoroughly impregnated, and rich in workability. A plate-shaped product 200×200×3 mm obtained by press molding the SMC (under the conditions of 135° C., 100 kg/cm², 3 minutes) exhibited properties which are shown in Table 4. It is noted from the table that the product excelled in thermal stability and hydrothermal stability and flame retardance.

EXAMPLE 17

A curable composition (16) was prepared by following the procedure of Example 16.

Then, in a two-arm kneader, the curable composition (16) was kept kneaded and 100 parts by weight of aluminum hydroxide having an average particle diameter of 3.5 microns (produced by Showa Light Metal Industries, Ltd. and marketed under trademark designation of "HIGILITE H-320") was added to and mixed with the kneaded curable composition (16), to produce a curable composition (17) of the present invention. This curable composition (17) showed viscosity of 960 poises at 30° C. A mass obtained by mixing this curable composition (17) with 1 part by weight of magnesium oxide (produced by Kyowa Chemical Industry Co., Ltd. and marketed under trademark designation of "Kyowamag #20") and 90 parts by weight of glass chops obtained by cutting a glass roving (produced by Nitto Boseki Co., Ltd. and marketed under product code of "RS-240F-546") to a length of ¼ inch. A bulk molding compound (BMC) was produced by allowing this mass to age at 40° C. for 20 hours. The BMC was devoid of tackiness, capable of keeping glass fibers fully impregnated, and excellent in workability. A molded product obtained by press molding this BMC by following the procedure of Example 16 exhibited properties as shown in Table 4. It is noted from the table that this product excelled in thermal stability and hydrothermal stability and in flame retardance.

CONTROL 5

An unsaturated polyester resin solution was prepared by dissolving 40 parts by weight of an unsaturated polyester obtained by condensing 0.3 mol of isophthalic acid, 0.7 mol of maleic anhydride, 0.3 mol of neopentyl glycol, 0.6 mol of propylene glycol, and 0.15 mol of hydrogenated bisphenol-A in 40 parts by weight of styrene and adding 0.005 part by weight of hydroquinone as a stabilizer to the resulting solution. In this resin solution, 20 parts by weight of liquid maleic polyisoprene having an average molecular weight of 25,000 (produced by Kuraray Co., Ltd. and marketed under trademark designation of "Kuraprene") was dissolved. Then, the resulting solution and 1.0 part by weight of t-butyl peroxybenzoate as a polymerization initiator, 1.0 part by weight of zinc stearate as an inner mold release agent, 0.5 part by weight of a silane coupling agent (produced by Shin-etsu Chemical Industry Co., Ltd. and marketed under product code of "KBM-503"), and 150 parts by weight of aluminum hydroxide having an average particle diameter of 17 microns (produced by Showa Light Metal Industries, Ltd. and marketed under trademark designation of "HIGILITE H-310") added thereto were mixed with a high-speed stirrer (produced by Asada Iron Works and marketed under trademark designation of "DESPA ®") at a rotational rate of 1,100 r.p.m. for 20 minutes, to afford a resin composition for comparison. This resin composition showed viscosity of 150 poises at 30° C. An impregnant (control) for the production of SMC was obtained by mixing this resin composition with 1 part by weight of magnesium oxide (produced by Kyowa Chemical Industry Co., Ltd. and marketed under trademark designation of "Kyowamag #20") as a thickener. A SMC for comparison was produced from this impregnant by following the procedure of Example 16. When this SMC was press molded by following the procedure of Example 16, the press molded product exhibited properties as shown in Table 4.

TABLE 4

| Performance of molded product | Example 15 | Example 16 | Example 17 | Control 5 |
| --- | --- | --- | --- | --- |
| Hydrothermal stability (500 hours' immersion in boiling water) | No change | No change | No change | Loss of luster and blushing of surface |
| Burning cigarette test (5 minutes' standing) | No change | No change | No change | Yellowing |
| Iron test (200° C., 10 minutes) | No change | No change | No change | Slight yellowing |
| Flame retardance (JIS K-7201) (Oxygen index) | 55–60 | 55–60 | 58–63 | 29–32 |

What is claimed is:

1. A curable composition comprising (A) a monomer mixture containing as an essential component thereof a mixture of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, and having said inorganic filler (B) dispersed in an amount of 250 to 800 parts by weight per 100 parts by weight of said monomer mixture (A).

2. A composition according to claim 1, wherein the amount of said polymerization initiator is in the range of 0.2 to 3.0% by weight based on the weight of said monomer mixture (A).

3. A composition according to claim 1, wherein said inorganic filler (B) is a hydrated metal oxide.

4. A composition according to claim 1, wherein said inorganic filler (B) is aluminum hydroxide.

5. A composition according to claim 1, wherein said dispersion of said inorganic filler (B) in said monomer mixture (A) is carried out by the use of a high-speed stirrer.

6. A composition according to claim 5, wherein said high-speed stirrer is rotated at a rate of not less than 1,000 r.p.m.

7. A composition according to claim 1, wherein said dispersion of said inorganic filler (B) in said monomer mixture (A) is carried out by the use of a low-speed kneader.

8. A composition according to claim 7, wherein said low-speed kneader is a two-arm kneader.

9. A composition according to claim 1, wherein said monomer mixture (A) contains 5 to 40 parts by weight of a thickening thermoplastic polymer and 0.5 to 5 parts by weight of a thickener based on 100 parts by weight of said monomer mixture (A).

10. A composition according to claim 9, wherein said thickening thermoplastic polymer possesses at least two carboxyl groups in the molecular unit thereof and said thickener is a metal oxide or metal hydroxide.

11. A composition according to claim 9, wherein said thickening thermoplastic polymer possesses at least two hydroxyl groups in the molecular unit thereof and said thickener is a polyfunctional isocyanate compound.

12. A method for the production of a curable composition, which comprises mixing (A) a monomer mixture containing as an essential component thereof a mixture of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, with a high-speed stirrer, with the total of said inorganic filler (B) falling in the range of 250 to 500 parts by weight based on 100 parts by weight of said monomer mixture (A), until the resulting blend forms a liquid possessing viscosity in the range of 2 to 100 poises.

13. A method according to claim 12, wherein said high-speed stirrer is rotated at a rate of not less than 1,000 r.p.m.

14. A method according to claim 12, wherein said high-speed stirrer is a disperser.

15. A method according to claim 12, wherein said inorganic filler (B) is a hydrated metal oxide.

16. A method according to claim 12, wherein said inorganic filler (B) is aluminum hydroxide.

17. A method according to claim 12, wherein said monomer mixture (A) contains 5 to 40 parts by weight of a thickening thermoplastic polymer and 0.5 to 5 parts by weight of a thickener based on 100 parts by weight of said monomer mixture (A).

18. A method for the production of a curable composition, which comprises mixing (A) a monomer mixture containing as an essential component thereof a mixture of 20 to 80% by weight of an aliphatic polyfunctional (meth)acrylate and 80 to 20% by weight of an aromatic vinyl compound, (B) an inorganic filler having an average particle diameter of not more than 5 microns, and (C) a catalytic amount of a polymerization initiator, with a low-speed kneader, with the total of said inorganic filler (B) falling in the range of 250 to 800 parts by weight based on 100 parts by weight of said monomer mixture (A), until the resulting blend forms a doughlike mass.

19. A method according to claim 18, wherein said low-speed kneader is rotated at a rate of not more than 100 r.p.m.

20. A method according to claim 18, wherein said low-speed kneader is a two-arm kneader.

21. A method according to claim 18, wherein said inorganic filler (B) is a hydrated metal oxide.

22. A method according to claim 18, wherein said inorganic filler (B) is aluminum hydroxide.

23. A method according to claim 18, wherein said monomer mixture (A) contains 5 to 40 parts by weight of a thickening thermoplastic polymer and 0.5 to 5 parts by weight of a thickener based on 100 parts by weight of said monomer mixture (A).

24. An article obtained by thermally curing said curable composition set forth in claim 1.

25. An article according to claim 24, wherein said article is artificial marble.

26. A cast molded article, obtained by casting the curable composition set forth in claim 5 and curing said composition under application of heat.

27. A press molded article, obtained by thermally curing the curable composition set forth in claim 7 under application of pressure.

28. A premix molding material, obtained by impregnating reinforcing short fibers with the curable composition set forth in claim 1.

29. A fiber-reinforced plastic article, obtained by adding the curable composition set forth in claim 1 to reinforcing fibers set in place in advance within a metal die for impregnation of said reinforcing fibers and thermally curing the impregnated reinforcing fibers under application of pressure.

30. A fiber-reinforced thermosetting molding material, obtained by impregnating reinforcing fibers with the curable composition set forth in claim 9.

* * * * *